United States Patent
Gilbert et al.

(10) Patent No.: US 6,202,694 B1
(45) Date of Patent: Mar. 20, 2001

(54) DETENT MECHANISM FOR A HYDRAULIC POWER STEERING GEAR

(75) Inventors: Wendell Lee Gilbert, Pleasant Shade; Lisa McCallum, Murfreesboro, both of TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/275,716

(22) Filed: Mar. 24, 1999

(51) Int. Cl.⁷ .................................................. F15B 9/10
(52) U.S. Cl. ..................... 137/625.23; 91/375 A; 91/375 R
(58) Field of Search ............... 91/375 A, 375 R; 137/625.23, 625.22; 251/297

(56) References Cited

U.S. PATENT DOCUMENTS

| | | | |
|---|---|---|---|
| 4,034,825 | * 7/1977 | Adams | 91/375 A X |
| 4,759,420 | * 7/1988 | Schipper, Jr. et al. | 91/375 A X |
| 4,872,393 | 10/1989 | Rabe et al. | |
| 5,233,906 | 8/1993 | Bishop et al. | |
| 5,368,058 | * 11/1994 | Gold et al. | 251/297 X |
| 5,575,193 | * 11/1996 | Bareis et al. | 91/375 A |
| 5,957,027 | * 9/1999 | Gilbert et al. | 91/375 A |

FOREIGN PATENT DOCUMENTS

| | | |
|---|---|---|
| 37 39 848 A1 | 6/1988 | (DE) . |
| 43 15 895 A1 | 11/1994 | (DE) . |
| 197 32 874 A1 | 4/1998 | (DE) . |
| 0749889 A1 | 12/1996 | (EP) . |
| 0585259B1 | 8/1997 | (EP) . |
| WO98/52812 | 11/1998 | (WO) . |

OTHER PUBLICATIONS

A copy of an European Search Report dated 29 Jun. 2000.

* cited by examiner

Primary Examiner—John Rivell
Assistant Examiner—Meredith H Schoenfeld
(74) Attorney, Agent, or Firm—Tarolli, Sundheim, Covell, Tummino & Szabo L.L.P.

(57) ABSTRACT

A hydraulic power steering gear (10) comprises first and second relatively rotatable valve members (40 and 42). The first valve member (40) has a radially extending first passage (64) and a second valve member (42) partially encircling the first valve member. The second valve member (42) has a cam surface (184) facing radially inward. The first and second valve members (40 and 42) are rotatable relative to one another to selectively port hydraulic fluid. A ring member (160) is fixedly attached to the first valve member (40). The ring member (160) has a radially extending first bore (186) radially aligned with the first passage (64). A detent member (250) acts between the first and second valve members (40 and 42). The detent member (250) is disposed in the cam surface (184) in the neutral condition to provide a physically perceptible indication to a driver of the vehicle of operation of the steering gear (10) between the neutral condition and the actuated condition. A spring (230) biases the detent member (184) radially outward. The spring (230) is disposed in the first passage (64) in the first valve member (40).

32 Claims, 5 Drawing Sheets

DETENT MECHANISM FOR A HYDRAULIC POWER STEERING GEAR

FIELD OF THE INVENTION

The present invention relates to a hydraulic power steering gear and, in particular, relates to a detent mechanism for an integral hydraulic power steering gear for turning dirigible wheels of a vehicle to effect steering of the vehicle.

BACKGROUND OF THE INVENTION

Integral hydraulic power steering gears are known. "Integral" refers to a steering gear containing a manual steering mechanism, a hydraulic control valve assembly, and a hydraulic power cylinder integrated into a single unit.

The hydraulic power cylinder typically comprises a chamber divided into two chamber portions by a piston. The piston has a set of teeth which mesh with a sector gear fixed to an output shaft. The output shaft is connected via steering linkage to dirigible wheels of a vehicle to steer the vehicle when the output shaft is rotated.

The hydraulic control valve assembly controls the flow of pressurized hydraulic fluid between a hydraulic pump and one of the chamber portions to control the direction and amount of steering. The valve assembly typically comprises two relatively rotatable valve elements, one of which is connected to a rotatable input shaft coupled to the vehicle steering wheel. The other valve element is connected with a follow-up member, such as a ball screw drive, which rotates in response to movement of the piston. The ball screw drive provides a direct connection between the input shaft and the piston to allow for manual steering of the vehicle in the event of hydraulic fluid pressure loss.

It is desirable for such an integral hydraulic power steering gear to provide the driver of the vehicle with a physically perceptible indication of operation of the steering gear between a neutral steering condition, in which the vehicle is being driven in a straight line, and an actuated steering condition, in which the vehicle is being turned. It is known to use a detent mechanism to provide the aforementioned physically perceptible indication to the driver.

SUMMARY OF THE INVENTION

The present invention is a hydraulic power steering gear for a vehicle. The power steering gear is operable between a neutral condition and an actuated condition. The power steering gear comprises a first valve member having a radially extending first passage, and a second valve member partially encircling the first valve member. The second valve member has at least one cam surface facing radially inward. The first and second valve members are rotatable relative to one another to selectively port hydraulic fluid. A ring member is fixedly attached to the first valve member. The ring member has a radially extending first bore radially aligned with the first passage in the first valve member. At least one detent member acts between the first and second valve members. The at least one detent member has a curved outer surface and is disposed in the at least one cam surface in the second valve member in the neutral condition to provide a physically perceptible indication to a driver of the vehicle of operation between the neutral condition and the actuated condition. At least one spring biases the at least one detent member radially outward. The at least one spring is disposed in the first passage in the first valve member.

A torsion bar acts between the first and second valve members. The torsion bar is at least partially disposed in an axially extending channel through the first valve member. A tubular spacer is disposed in the channel through the first valve member. The tubular spacer encircles the torsion bar and is engaged by the at least one spring. At least one plunger member is disposed in the first bore in the ring member. The at least one plunger member is biased radially outward against the at least one detent member by the at least one spring.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF A PREFERRED EMBODIMENT

The present invention is illustrated as applied to a hydraulic power steering gear 10 (FIG. 1) for turning dirigible wheels (not shown) of a vehicle to effect steering of the vehicle. The power steering gear 10 is an integral hydraulic power steering gear and includes a two-piece housing 12 (FIG. 2) having a hydraulic power cylinder 14. The power cylinder 14 comprises a chamber 16 divided into two chamber portions 18 and 20, respectively, by a piston 22. The piston 22 includes an inner bore 23 with a helical groove 24. The piston 22 also has a set of external teeth 25 which mesh with a sector gear 26. The sector gear 26 is fixed to an output shaft 28 which extends outwardly from the housing 12. The output shaft 28 is connected to a pitman arm (not shown) which, in turn, is connected via steering linkage (not shown) to the dirigible wheels of the vehicle to steer the vehicle. As the piston 22 moves in the chamber 16, the output shaft 28 is rotated to operate the steering linkage.

A hydraulic control valve assembly 30 controls the flow of pressurized hydraulic fluid between a hydraulic circuit including a hydraulic pump (not shown) and one of the chamber portions 18, 20 to control the direction and amount of steering. The valve assembly 30 is actuated by a rotatable input shaft 32 coupled for rotation with a manually rotatable vehicle steering wheel (not shown).

The valve assembly 30 comprises first and second valve members 34 and 36, respectively. The valve members 34, 36 are relatively rotatable about a valve axis 38. The first valve member 34 comprises a valve core 40 and the second valve member 36 comprises a valve sleeve 42. The valve core 40 is located coaxially within the valve sleeve 42 and is supported for rotation by the valve sleeve.

The valve core 40 is formed integrally as one piece with the input shaft 32. The valve core 40 has oppositely disposed first and second end portions 44 and 46, respectively (FIG. 2), and a valve section 48 between the end portions. The first end portion 44 of the valve core 40 projects beyond the valve sleeve 42 and the second end portion 46 of the valve core lies within the valve sleeve. The first end portion 44 includes splines 50 for connecting to a steering shaft (not shown) coupled to the vehicle steering wheel. An inner surface 51 (FIG. 2) defines an internal channel 52 extending axially from the first end portion 44 of the valve core 40 to the second end portion 46.

Figure 1:
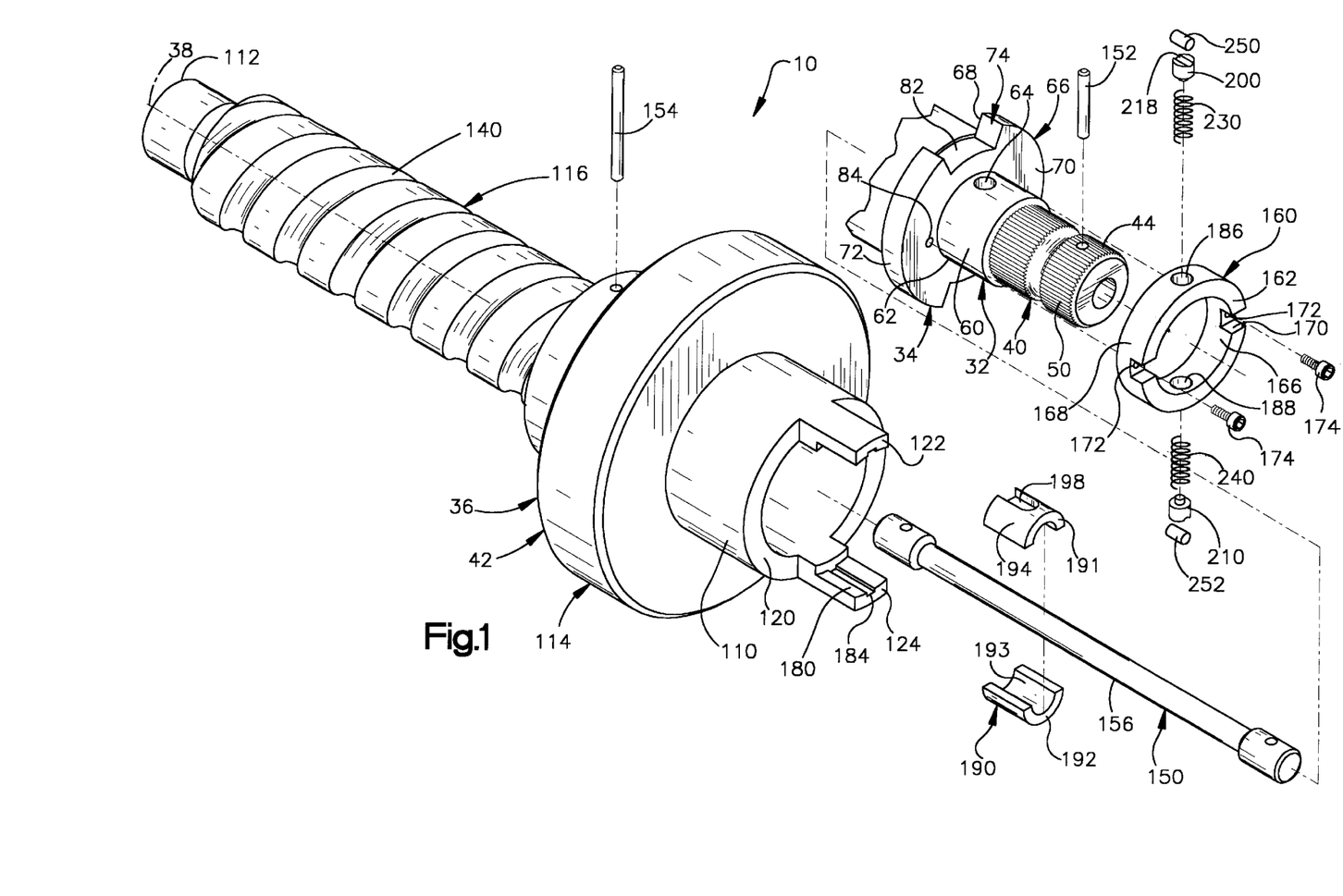
FIG. 1 is an exploded perspective view of a portion of an integral hydraulic power steering gear constructed in accordance with the present invention, the power steering gear being shown with parts omitted for clarity.
Figure 2:
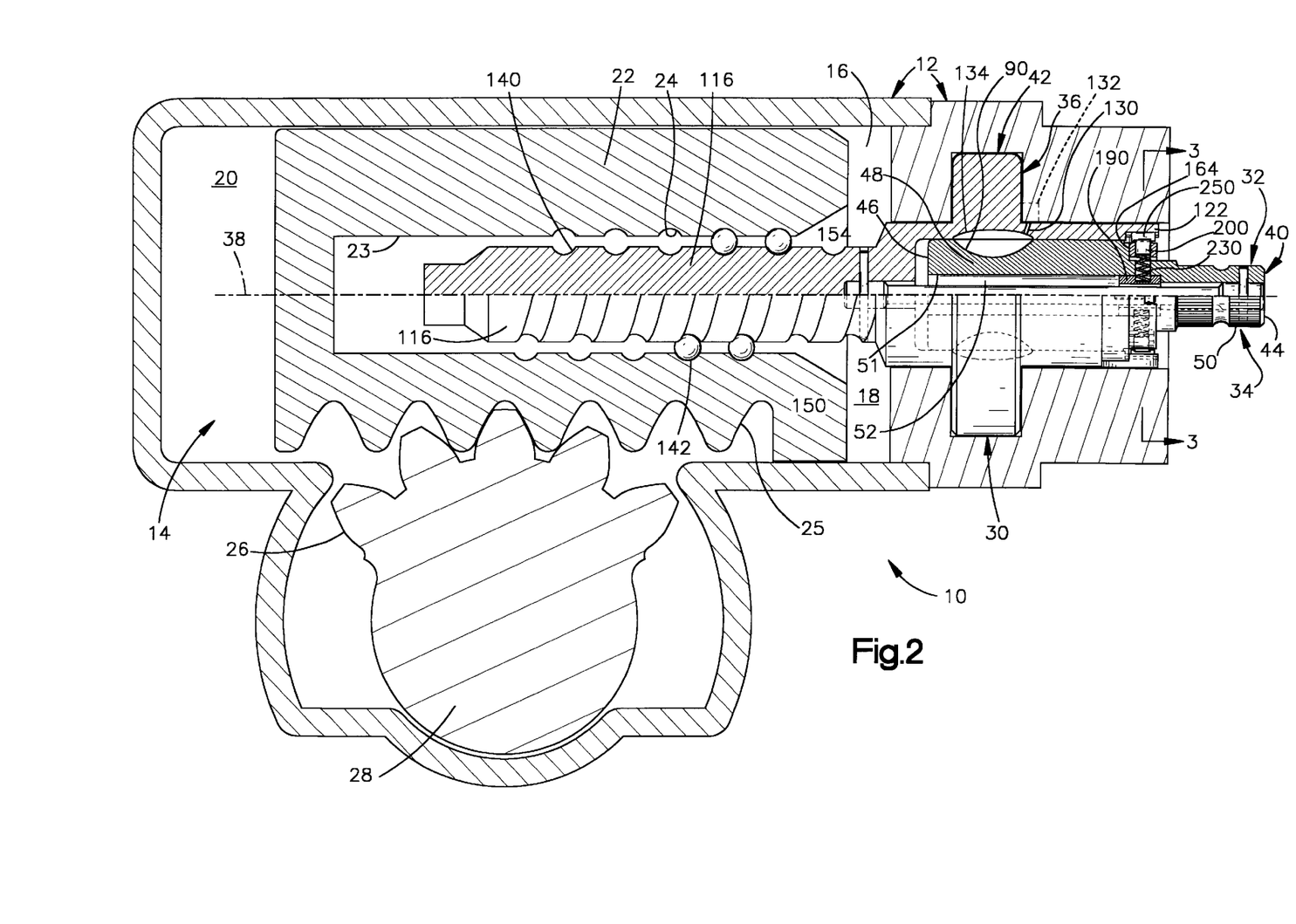
FIG. 2 is a sectional view of the power steering gear of FIG. 1.

Adjacent the first end portion 44, the valve core 40 includes a shank section 60 having a cylindrical outer surface 62 (FIG. 1). Radially extending first and second passages 64 and 65, respectively (FIG. 3), extend through the shank section 60 of the valve core 40. The first and second passages 64 and 65 are diametrically opposed to one another and extend from the internal channel 52 to the outer surface 62. The shank section 60 of the valve core 40 includes an annular collar 66 (FIG. 1) extending radially outward from the cylindrical outer surface 62. The collar 66 has first and second radially extending surfaces 68 and 70, respectively, connected by an axially extending peripheral surface 72. The second radially extending surface 70 includes a pair of axially extending threaded openings 84, only one of which is visible in FIG. 1. The threaded openings 84 are located 180° apart.

Figure 3:
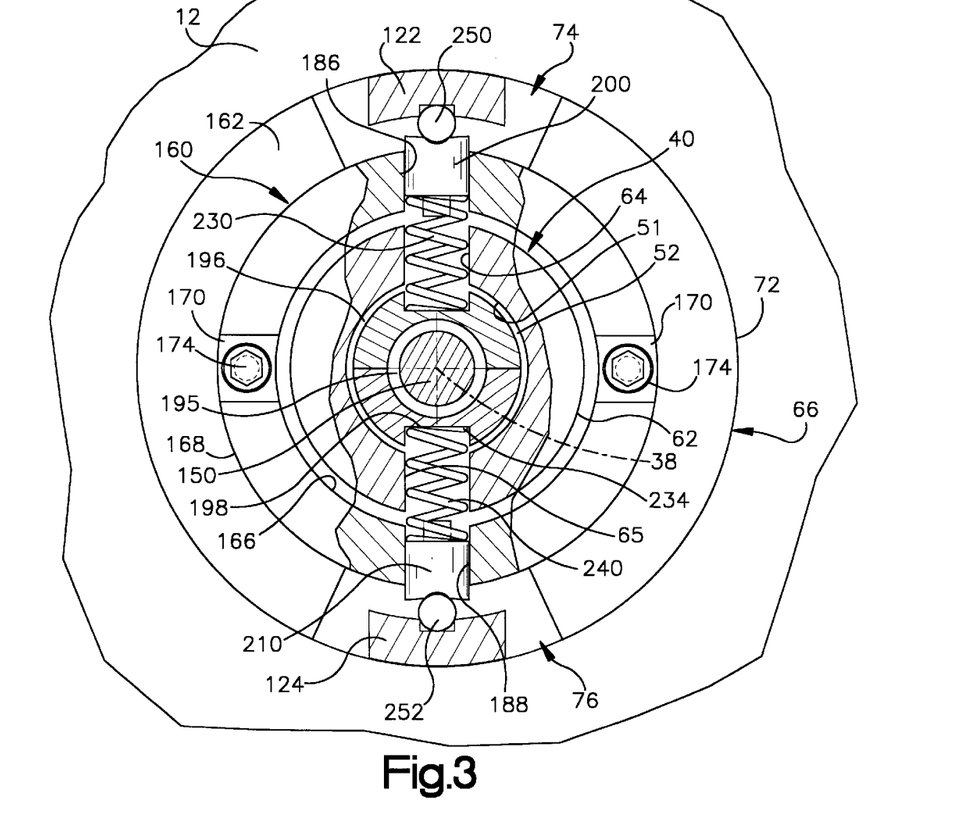
FIG. 3 is a view taken along line 3—3 in FIG. 2.

The peripheral surface 72 of the collar 66 includes a pair of diametrically opposed radial cut-outs 74 and 76, respectively (FIG. 3). The radial cut-outs 74 and 76 are centered approximately 90° from each of the threaded openings 84. Each of the radial cut-outs 74, 76 is defined by first and second radial surfaces 78 and 80, respectively (FIG. 4), connected by a third arcuate surface 82 (FIG. 1) extending between the first and second radial surfaces.

The valve section 48 of the valve core 40 has a circumferentially spaced plurality of axially extending grooves 90 (FIG. 2) as is known in the art. A first portion of the grooves 90 are fluidly connected with the internal channel 52 extending through the valve core 40. The internal channel 52 communicates via passages (not shown) with the return line of the hydraulic pump circuit. A second portion of the grooves 90 are in fluid communication with axially extending grooves 130 in the valve sleeve 42 as described below.

The valve sleeve 42 has oppositely disposed first and second ends 110 and 112, respectively (FIG. 1). The valve sleeve 42 includes a sleeve section 114 adjacent the first end 110, and a ball screw section 116 adjacent the second end 112.

The first end 110 of the valve sleeve 42 includes a radially extending surface 120 (FIG. 1). A pair of axially projecting lugs 122 and 124 extend from the radially extending surface 120. The lugs 122 and 124 are diametrically opposed to one another and are dimensionally smaller than the diametrically opposed cut-outs 74 and 76 in the valve core 40. The lugs 122 and 124 are disposed in the cut-outs 74 and 76, respectively, as best seen in FIG. 3. The lugs 122 and 124 are adapted to engage one of the first and second surfaces 78 and 80 defining each cut-out upon rotation of between 2° and 8° of the valve core 40 relative to the valve sleeve 42. The engagement of the lugs 122 and 124 with the cut-outs 74 and 76, respectively, in the valve core 40 causes the valve sleeve 42 to be rotated along with the valve core. Such rotation of the valve sleeve 42 causes the piston 22 to move axially in the chamber 16 and, hence, allows for manual steering of the vehicle even if a loss in hydraulic fluid pressure has occurred.

Each of the lugs 122 and 124 includes an arcuate inner surface 180 facing radially inward toward the valve core 40. A cam surface 184, preferably in the form of an axially extending notch, is formed in the inner surface 180 of each of the lugs 122, 124. The cam surfaces 184 face radially inward toward the valve core 40 and, according to one embodiment of the invention, have a cross-section defined by three sides of a rectangle.

The sleeve section 114 of the valve sleeve 42 has a plurality of radially directed passages 130 (FIG. 2) extending from its outer circumference to its inner circumference. The passages 130 communicate with an annular chamber 132 in the housing 12 which is fluidly connected to the hydraulic pump. A plurality of axially extending grooves 134 are formed in the inner surface of the valve sleeve 42 as is known in the art. The grooves 134 fluidly communicate with the second portion of the grooves 90 in the valve core 40. Further, a first portion of the grooves 134 in the valve sleeve 42 fluidly communicate via passages (not shown) with the first chamber portion 18 in the housing 12, and a second portion of the grooves 134 fluidly communicate via passages (not shown) with the second chamber portion 20 in the housing. As is known in the art, when the valve core is rotated relative to the valve sleeve 42, hydraulic fluid is ported through the grooves 90 and 134 and associated passages to one of the chamber portions 18 and 20, while the hydraulic fluid is vented from the other chamber portion, thereby causing the piston 22 to move accordingly.

The ball screw section 116 of the valve sleeve 42 includes a helical groove 140 formed on its outer periphery. A plurality of balls 142 are located in the helical groove 140. The balls 142 are also located in the helical groove 24 in the bore 23 formed in the piston 22. As is well known in the art, axial movement of the piston 22 causes the ball screw portion 116 to rotate which, in turn, causes the rest of the valve sleeve 42 to rotate.

A torsion bar 150 (FIG. 1) extends through the channel 52 in the valve core 40 and connects the valve core and the valve sleeve 42. One end of the torsion bar 150 is connected by a pin 152 to the first end portion 44 of the valve core 40. The other end of the torsion bar 150 is connected by a pin 154 to the ball screw section 116 of the valve sleeve 42. The torsion bar 150 has a cylindrical outer surface 156.

A tubular spacer 190 is located in the channel 52 through the valve core 40 and encircles a portion of the torsion bar 150. The tubular spacer 190 is preferably formed by an upper spacer half 191 and a lower spacer half 192 which are joined together in a manner not shown. The tubular spacer 190 has cylindrical inner and outer surfaces 193 and 194, respectively. The outer surface 194 of each of the spacer halves 191 and 192 includes a slot 198. The slots 198 are diametrically opposed to one another. Each of the slots 198 radially aligns with one of the first and second passages 64 and 65 through the valve core 40. An annular first gap 195 (FIG. 3) is defined between the inner surface 193 of the spacer 190 and the outer surface 156 of the torsion bar 150. An annular second gap 196 is defined between the outer surface 194 of the spacer 190 and the inner surface 51 which defines the channel 52 through the valve core 40.

The steering gear 10 includes a ring member 160 (FIG. 1) which is attached to the valve core 40. The ring member 160 has parallel first and second radially extending surfaces 162 and 164 (FIG. 2), respectively, which are connected by cylindrical inner and outer surfaces 166 and 168, respectively (FIG. 1). The second radially extending surface 164 abuts the radially extending surface 70 of the collar 66 of the valve core 40. A pair of recesses 170 are formed in the first radially extending surface 162. The recesses 170 are located 180° apart. An axially extending clearance hole 172 is located in each of the recesses 170. A threaded fastener 174 extends through each of the clearance holes 172 in the ring member 160 and into the threaded openings 84 in the second radially extending surface 70 of the collar 66 to secure the ring member to the valve core 40.

The ring member 160 includes diametrically opposed first and second bores 186 and 188, respectively. The bores 186, 188 extend radially between the inner and outer surfaces 166 and 168, respectively, of the ring member 160 (see FIG. 3). The first bore 186 is aligned radially with the first passage 64 in the valve core 40, while the second bore 188 is aligned radially with the second passage 65 in the valve core.

The steering gear 10 further includes first and second plunger members 200 and 210, respectively, and first and second springs 230 and 240, respectively. The first and second plunger members 200 and 210 are identical in shape and are disposed diametrically opposite one another in the first and second bores 64 and 65, respectively, through the ring member 160. Each of the plunger members 200, 210 has a radially outer end surface 212 (FIG. 4), a radially inner end surface 214, and a cylindrical outer surface 216 extending between the inner and outer end surfaces. The radially outer surface 212 of each of the plunger members 200 and 210 includes an indentation 218. According to a preferred embodiment of the invention, the indentations 218 have a transversely extending semi-cylindrical configuration. The inner end surface 214 of each of the plunger members 200 and 210 includes a spring pilot projection 220 (FIG. 4) extending radially inward toward the tubular spacer 190.

The first spring 230 is disposed in the first passage 64 through the valve core 40 (see FIG. 3). The second spring 240 is disposed in the second passage 65 through the valve core 40. A radially outer end 232 of each of the springs 230 and 240 fits over the respective spring pilot projection 220 on each of the plunger members 200 and 210. A radially inner end 234 (FIG. 3) of each of the springs 230 and 240 is located in a respective one of the slots 198 in the tubular spacer 190. The first and second springs 230 and 240 bias the first and second plunger members 200 and 210, respectively, radially outward.

The steering gear 10 includes first and second detent members 250 and 252. The first and second detent members 250 and 252 are disposed diametrically opposite one another between the ring member 160 and the first and second plunger members 200 and 210, respectively. More particularly, the first detent member 250 is located between the first plunger member 200 and the inner surface 180 of the first lug 122 on the valve sleeve 42. The second detent member 252 is located between the second plunger member 210 and the inner surface 180 of the second lug 124 on the valve sleeve 42. The first and second detent members 250 and 252 thus act between the valve sleeve 42 and the valve core 40, t o which the ring member 160 is attached.

Figure 4:
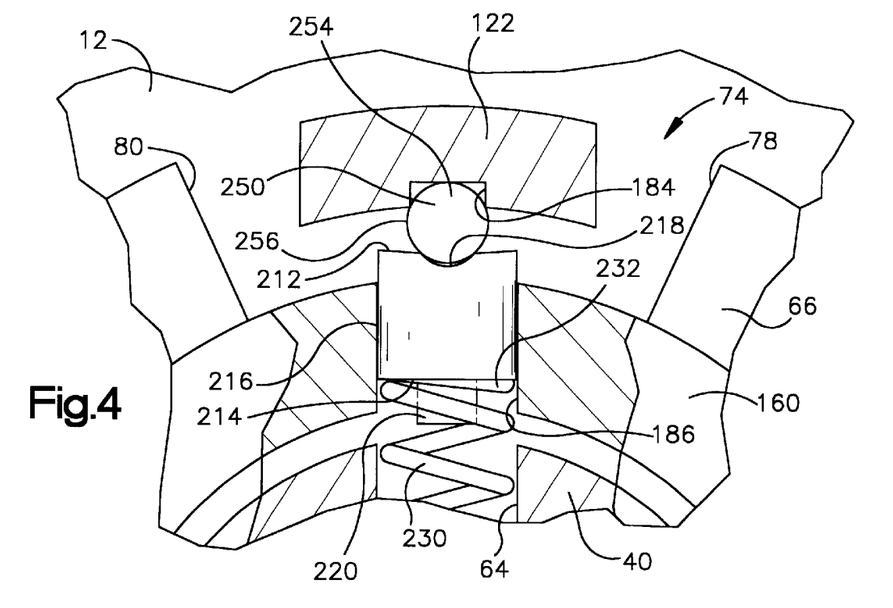
FIG. 4 is an enlarged view of a portion of FIG. 3 with the power steering gear in a neutral steering condition.

The first and second detent members 250 and 252 are identical in configuration. According to a preferred embodiment of the invention, the detent members 250 and 252 comprise transversely extending rollers 254 (FIG. 4). Each of the rollers 254 has a cylindrical outer surface 256. Preferably, the radius of curvature of the roller 254 is slightly larger the radius of curvature of the indentations 218 in the plunger members 200, 210.

The steering gear 10 is operable between a neutral steering condition, in which the vehicle is being driven in a straight line, and an actuated steering condition, in which the vehicle is being turned, to steer the vehicle. In the neutral condition shown in FIGS. 3 and 4, the first detent member 250 is disposed in the cam surface 184 in the first lug 122, and is also disposed in the indentation 218 in the first plunger member 200. Similarly, the second detent member 252 is disposed in the cam surface 184 in the second lug 124, and is also disposed in the indentation 218 in the second plunger member 210.

Figure 5:
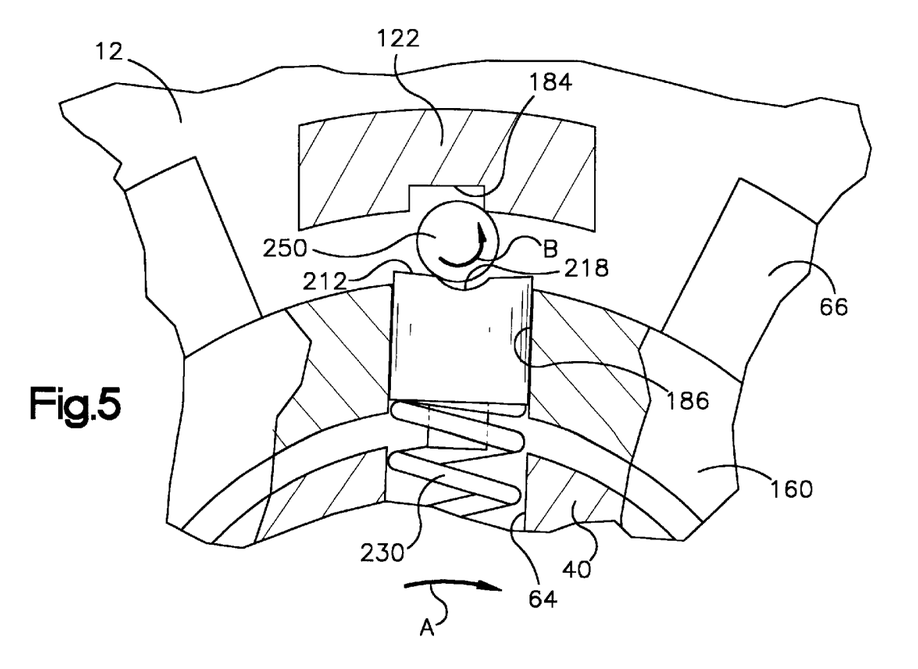
FIG. 5 is a view similar to FIG. 4 with the power steering gear in an actuated condition.

When the vehicle steering wheel is turned by the driver, the valve core 40 is rotated relative to the valve sleeve 42, causing the ring member 160 attached to the valve core to be rotated relative to the valve sleeve. This rotation of the valve core 40, shown in FIG. 5 as rotation in the direction of arrow A, causes the first and second detent members 250 and 252 to rotate in the direction indicated by arrow B, and to move out of the cam surfaces 184 in the lugs 122 and 124, as well as out of the indentations 218 in the plunger members 200, 210. This movement of the detent members 250, 252 applies a radially inwardly directed force on the outer surface 212 of each of the plunger members 200 and 210, causing the plunger members to move radially inward against the bias of the springs 230 and 240.

Figure 6:
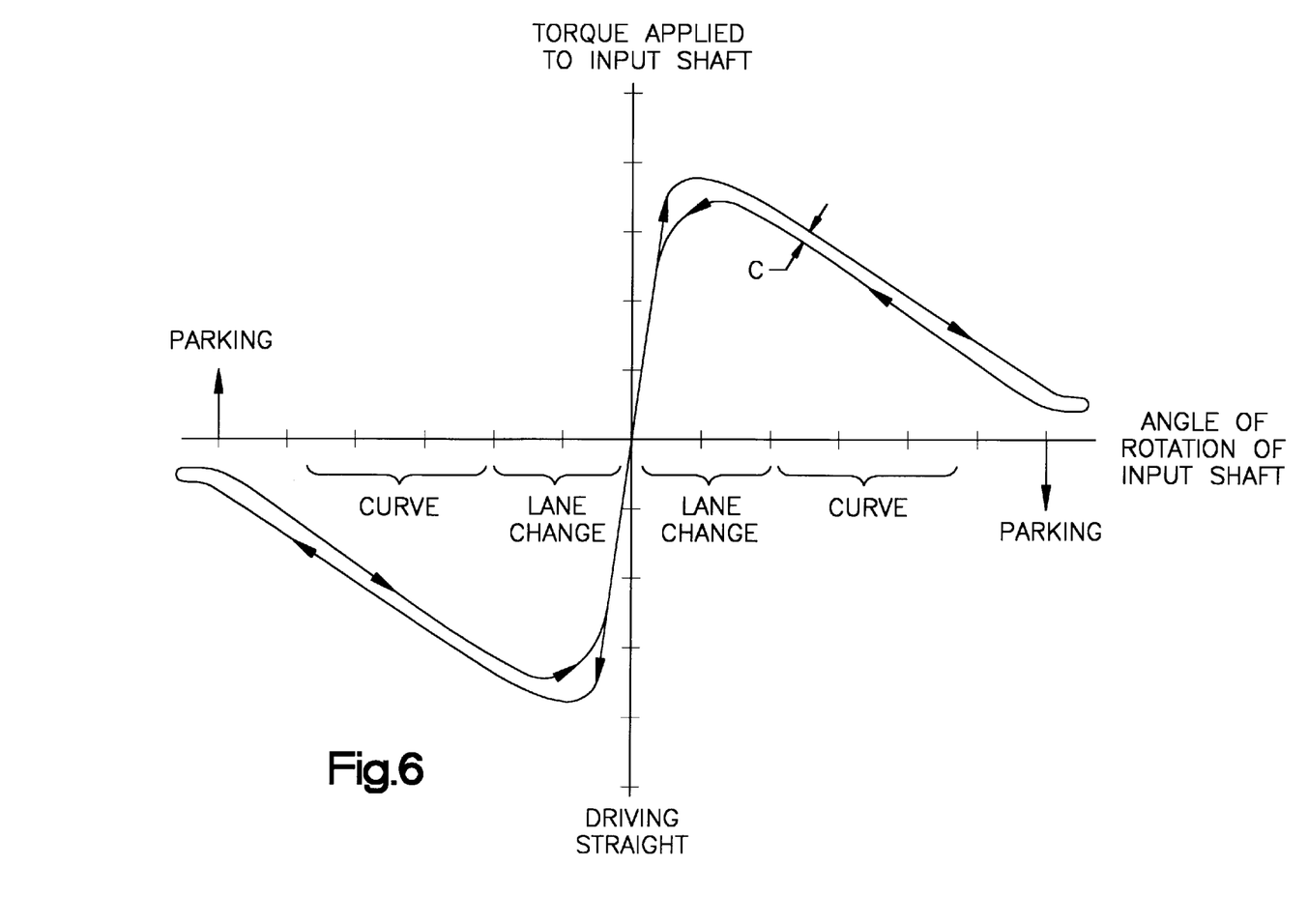
FIG. 6 is a graph of the torque required to rotate the power steering gear versus the angle of rotation of the power steering gear.

A change in steering torque needed for the driver to turn the vehicle steering wheel is felt by the driver when the detent members 250 and 252 are moved in and out of the cam surfaces 184 and the indentations 218 in the plunger members 200, 210. As graphically depicted in FIG. 6, the steering torque is highest when the steering gear 10 is initially moved from the neutral condition to the actuated condition, such as during a lane change. During further rotation of the steering wheel and, thus, the valve core 40, the steering torque required to turn the steering wheel tapers off. As the steering wheel is returned toward the neutral steering condition though, the steering torque required, and thus felt by the driver, again increases. This increase in steering torque results from the detent members 250, 252 approaching a re-positioning of them selves in the cam surfaces 184 and the indentations 218. When the detent members 250, 252 are once again disposed in the cam surfaces 184 and in the indentations 218, the steering torque drops to zero. The aforementioned changes in steering torque required to operate the steering gear 10 between the neutral condition and the actuated condition are physically perceptible by the driver of the vehicle and thus provide the driver with a feel for when the steering gear is "on-center". The difference C shown in the torque curve is the result of friction in the steering gear 10. It should be noted that the contribution of the torsion bar 150 to the steering torque is not shown in the graph of FIG. 6.

The magnitude of the steering torque required to operate the steering gear 10 in and out of the neutral condition is determined by the size and/or shape of the cam surfaces 184 and the indentations 218. For example, if the radii of curvature of the indentations 218 were substantially smaller than the radius of curvature of the detent members 250 and 252, the steering torque needed to move the detent members in and out of the indentations would be decreased. Further, it is contemplated that the radii of curvature for the indentations 218 and the shape of the cam surfaces 184 could be changed in order to optimize a steering torque feel for the driver.

In addition to providing the driver of the vehicle with an "on-center" feel, the steering gear 10 is self-centering by having diametrically opposed detent members 250 and 252 and associated plunger members 200 and 210. The inwardly directed reaction forces on the detent members 250 and 252, which oppose the bias of the springs 230 and 240, cancel each other out and eliminate any side or eccentric load on the valve core 40. In addition, the steering gear 10 is equipped to compensate for tolerance variations in the manufacturing of the valve sleeve 42. For example, if the cam surfaces 184 in the lugs 122 and 124 were located off-center (i.e., not properly located perpendicular to the radially extending surface 120 of the valve sleeve 42), the cylindrical shape of the plunger members 200 and 210 will allow the plunger members to rotate in the bores 186 and 188, respectively, while the detent members 250 and 252 rotate in a transverse yaw direction until the detent members align with the off-center cam surfaces 184. This feature also reduces friction in the steering gear 10.

A further advantage of the steering gear 10 is that manufacturing tolerances in the length of the springs 230 and 240 is accounted for so that the forces placed on the plunger members 200 and 210 by the springs are balanced despite unequal spring lengths. The first and second gaps 195 and 196 surrounding the spacer 190 allow the spacer to float in the channel 52 through the valve core 40. If, for example, the first spring 230 were slightly longer than the second spring 240, the spacer 190 would shift slightly off of the central axis 38 of the valve core 40 in order to balance the forces on the plunger members 200 and 210.

Yet another advantage of the steering gear 10 is that by using the ring member 160 to carry the plunger members 200 and 210, torsional forces caused by rotation of the valve core 40 are not transmitted to the plunger members as could occur if the plunger members were carried directly by the valve core. The attachment of the ring member 160 to the valve core 40 at locations which are spaced 90° from the locations where the plunger members 200 and 210 are present in the ring member effectively isolates the plunger members from such torsional forces which could induce undesirable friction into the detent mechanism.

From the above description of the invention, those skilled in the art will perceive improvements, changes and modifications. For example, the structure of the steering gear 10 which provides the "on-center" feel to the driver could be applied to other types of steering gears other than an integral steering gear. Such improvements, changes and modifications within the skill of the art are intended to be covered by the appended claims.

What is claimed is:

1. A hydraulic power steering gear for a vehicle, said power steering gear being operable between a neutral condition and an actuated condition, said power steering gear comprising:
   a first valve member having a radially extending first passage;
   a second valve member partially encircling said first valve member, said second valve member having at least one cam surface facing radially inward, said first and second valve members being rotatable relative to one another to selectively port hydraulic fluid;
   a ring member fixedly attached to said first valve member, said ring member having a radially extending first bore radially aligned with said first passage in said first valve member;
   at least one detent member acting between said first and second valve members, said at least one detent member having a curved outer surface and being disposed in said at least one cam surface in said second valve member in the neutral condition to provide a physically perceptible indication to a driver of the vehicle of operation between the neutral condition and the actuated condition; and
   at least one spring biasing said at least one detent member radially outward, said at least one spring being disposed in said first passage in said first valve member.

2. The power steering gear of claim 1 further comprising a torsion bar acting between said first and second valve members, said torsion bar being at least partially disposed in an axially extending channel through said first valve member.

3. The power steering gear of claim 2 further comprising a tubular spacer disposed in said channel through said first valve member, said tubular spacer encircling said torsion bar and being engaged by said at least one spring.

4. The power steering gear of claim 1 further comprising at least one plunger member disposed in said first bore in said ring member, said at least one plunger member being biased radially outward against said at least one detent member by said at least one spring.

5. The power steering gear at claim 4 wherein said at least one plunger member has an outer surface with an indentation, said at least one detent member being disposed in said indentation in said at least one plunger member in the neutral steering condition.

6. The power steering gear of claim 4 wherein said at least one detent member moves out of said at least one cam surface in said second valve member and out of said indentation in said at least one plunger member in the actuated condition.

7. The power steering gear of claim 4 wherein said at least one detent member is a transversely extending cylindrical roller having an axis.

8. The power steering gear of claim 7 wherein said at least one plunger has a central axis which intersects and extends normal to said axis of said cylindrical roller, said at least one plunger member being rotatable about said central axis to cause said at least one detent member to rotate in a transverse yaw direction to ensure alignment of said at least one detent member in said at least one cam surface.

9. The power steering gear of claim 4 wherein said at least one plunger member moves radially inward against the bias of said at least one spring upon operation of said power steering gear from the neutral condition to the actuated condition.

10. The power steering gear of claim 9 wherein the torque necessary to rotate said first valve member relative to said second valve member reduces from an initially relatively high torque to a subsequent relatively low torque upon continued rotation of said first valve member.

11. The power steering gear of claim 4 wherein said at least one cam surface on said second valve member comprises diametrically opposed first and second cam surfaces, said at least one plunger member comprises first and second plunger members disposed diametrically opposite one another, and said at least one detent member comprises oppositely disposed first and second detent members.

12. The power steering gear of claim 11 wherein said at least one spring comprises diametrically opposed first and second springs, said second spring being disposed in a radially extending second passage in said first valve member, said second spring biasing said second plunger member radially outward against said second detent member.

13. The power steering gear of claim 12 wherein said ring member has a radially extending second bore radially aligned with said second passage in said first valve member, said second plunger member being disposed in said second bore.

14. A hydraulic power steering gear for a vehicle, said power steering gear being operable between a neutral condition and an actuated condition, said power steering gear comprising:

a first valve member having a radially extending first passage and a channel extending axially through said first valve member;

a second valve member partially encircling said first valve member, said second valve member having at least one cam surface facing radially inward, said first and second valve members being rotatable relative to one another to selectively port hydraulic fluid;

a torsion bar acting between said first and second valve members, said torsion bar being at least partially disposed in said channel extending through said first valve member;

a tubular spacer disposed in said channel and encircling a portion of said torsion bar, said tubular spacer and said channel through said first valve member together defining an annular first gap, said tubular spacer and said torsion bar together defining an annular second gap, said first and second gaps permitting radial displacement of said tubular spacer relative to said first valve member and to said torsion bar;

at least one detent member acting between said first and second valve members, said at least one detent member having a curved outer surface and being disposed in said at least one cam surface in said second valve member in the neutral condition to provide a physically perceptible indication to a driver of the vehicle of operation between the neutral condition and the actuated condition; and at least one spring biasing said at least one detent member radially outward, said at least one spring being disposed in said first passage in said first valve member and having a first end engaging said tubular spacer in said channel through said first valve member.

15. The power steering gear of claim 14 wherein said at least one cam surface on said second valve member comprises diametrically opposed first and second cam surfaces, said at least one detent member comprising first and second detent members acting between said first and second valve members, said second detent member being disposed in said second cam surface in the neutral condition.

16. The power steering gear of claim 15 wherein said first valve member has a radially extending second passage, said at least one spring comprising first and second springs which engage said tubular spacer at diametrically opposed locations, said second spring being disposed in said second passage and biasing said second detent member radially outward.

17. The power steering gear of claim 14 further comprising a ring member fixedly attached to said first valve member, said ring member having a radially extending first bore which is radially aligned with said first passage in said first valve member.

18. The power steering gear of claim 17 further comprising at least one plunger member disposed in said first bore in said ring member, said at least one plunger member being biased radially outward against said at least one detent member by said at least one spring.

19. The power steering gear at claim 18 wherein said at least one plunger member has an outer surface with an indentation, said at least one detent member being disposed in said indentation in said at least one plunger member in the neutral steering condition.

20. The power steering gear of claim 19 wherein said at least one detent member moves out of said at least one cam surface in said second valve member and out of said indentation in said at least one plunger member in the actuated condition.

21. The power steering gear of claim 20 wherein said at least one plunger member moves radially inward against the bias of said at least one spring upon operation of said power steering gear from the neutral condition to the actuated condition.

22. The power steering gear of claim 21 wherein the torque necessary to rotate said first valve member relative to said second valve member reduces from an initially relatively high torque to a subsequent relatively low torque upon continued rotation of said first valve member.

23. A hydraulic power steering gear for a vehicle, said power steering gear being operable between a neutral condition and an actuated condition, said power steering gear comprising:

a first valve member having a radially extending first passage;

a second valve member partially encircling said first valve member, said second valve member having at least one cam surface facing radially inward, said first and second valve members being rotatable relative to one another to selectively port hydraulic fluid;

a ring member fixedly attached to said first valve member, said ring member having a radially extending first bore radially aligned with said first passage in said first valve member;

at least one detent member acting between said first and second valve members, said at least one detent member having a curved outer surface and being disposed in said at least one cam surface in said second valve member in the neutral condition to provide a physically perceptible indication to a driver of the vehicle of operation between the neutral condition and the actuated condition;

at least one plunger member disposed in said first bore in said ring member to isolate said at least one plunger member from torsional forces caused by relative rotation between said first and second valve members, said at least one plunger member being radially displaceable within said first bore; and at least one spring biasing said at least one detent member radially outward, said at least one spring being disposed in said first passage in said first valve member.

24. The power steering gear of claim 23 wherein said at least one plunge r member has an indentation for supporting said at least one detent member, said at least one detent member being disposed in said arcuate indentation in the neutral condition.

25. The power steering gear of claim 24 further comprising a torsion bar acting between said first and second valve members, said torsion bar being at least partially disposed in an axially extending channel through said first valve member.

26. The power steering gear of claim 25 further comprising a tubular spacer disposed in said channel through said first valve member, said tubular spacer encircling said torsion bar and being engaged by said at least one spring.

27. The power steering gear of claim 24 wherein said at least one cam surface on said second valve member comprises diametrically opposed first and second cam surfaces, said at least one plunger member comprises first and second plunger members disposed diametrically opposite one another, and said at least one detent member comprises oppositely disposed first and second detent members.

28. The power steering gear of claim 27 wherein said at least one spring comprises diametrically opposed first and second springs, said second spring being disposed in a radially extending second passage in said first valve member, said second spring biasing said second plunger member radially outward against said second detent member.

29. The power steering gear of claim 28 wherein said ring member has a radially extending second bore radially aligned with said second passage in said first valve member, said second plunger member being disposed in said second bore.

30. The power steering gear of claim 24 wherein said at least one detent member moves out of said at least one cam surface in said second valve member and out of said indentation in said at least one plunger member in the actuated condition.

31. The power steering gear of claim 23 wherein said at least one plunger member moves radially inward against the bias of said at least one spring upon operation of said power steering gear from the neutral condition to the actuated condition.

32. The power steering gear of claim 23 wherein the torque necessary to rotate said first valve member relative to said second valve member reduces from an initially relatively high torque to a subsequent relatively low torque upon continued rotation of said first valve member.

* * * * *